United States Patent [19]

Ikegami et al.

[11] Patent Number: 4,726,038

[45] Date of Patent: Feb. 16, 1988

[54] DIGITAL COMMUNICATION SYSTEM

[75] Inventors: Fumio Ikegami, No. 5-7010 Yuniuji Manshion, 34-10 Kohatauchihata, Uji-shi, Kyoro-fu; Susumu Yoshida, Uji; Tsutomu Takeuchi, Muko; Sirikiat Ariyavisitakul, Kyoto, all of Japan

[73] Assignees: Fumio Ikegami; Mitsubishi Denki Kabushiki Kaisha, both of Tokyo, Japan

[21] Appl. No.: 768,551

[22] Filed: Aug. 22, 1985

[30] Foreign Application Priority Data

Jan. 22, 1985 [JP] Japan .................................. 60-10555
May 15, 1985 [JP] Japan .................................. 60-105380

[51] Int. Cl.$^4$ ............................................. H04L 27/13
[52] U.S. Cl. ...................................... 375/53; 375/57; 375/86; 455/65
[58] Field of Search ........................ 375/52, 53, 54, 56, 375/57, 77, 83, 84, 85, 86, 101, 67; 332/9 R, 10, 16 R; 329/104, 107, 110; 360/42, 44; 455/65

[56] References Cited

U.S. PATENT DOCUMENTS 3,419,804 12/1968 Gorog et al. ......................... 375/55
3,914,695 10/1975 Giusto .................................... 375/67
4,130,802 12/1978 Nossen et al. ......................... 375/55
4,174,505 11/1979 Querry .................................. 375/56
4,229,821 10/1980 Jager et al. ............................ 375/53
4,584,693 4/1986 Levy et al. ............................ 375/56

OTHER PUBLICATIONS

Performance of MSK High-Speed Digital Transmission in Land Mobile Radio Channels, by Hata et al., IEEE Global Telecommunications Conference, Atlanta, Georgia, Nov. 26-29, 1984, Conference Record, vol. 1 of 3, pp. 518-523.
Mobile Communications Engineering, by William C. Y. Lee, pp. 248-257.

Primary Examiner—Benedict V. Safourek
Attorney, Agent, or Firm—Lowe, Price, Leblanc, Becker & Shur

[57] ABSTRACT

The present invention provides a communication system which employs a signal whose carrier phase is shifted by a constant amount $\Delta\theta$ per time slot in correspondence to each symbol (1 or 0) transmitted, and the phase shift is performed by $\Delta\theta/2$ (or $-\Delta\theta/2$) in the first ½ time slot and further by $\Delta\theta/2$ (or $-\Delta\theta/2$) in the second ½ time slot thereby to improve the bit error rate in multipath propagation.

8 Claims, 23 Drawing Figures

(A) BINARY INFORMATION SEQUENCE (B) DSK SIGNAL

FIG. 6

(A) D WAVE (B) U WAVE

MEASURED VALUES
△ : $f_D$ = 80 Hz
□ : $f_D$ = 20 Hz
× : $f_D$ = 5 Hz
THEORETICAL VALUES
SOLID LINE ———

(A) BINARY INFORMATION SEQUENCE (B) PHASE SHIFT OF DSK (C) I-CH SIGNAL (D) Q-CH SIGNAL

(A) BINARY INFORMATION SIGNAL (B) DSK PHASE SHIFT (C) DIFFERENTIAL DETECTION OUTPUT (D) BINARY INFORMATION SEQUENCE (DECODED SYMBOL)

FIG. 23

DIGITAL COMMUNICATION SYSTEM

BACKGROUND OF THE INVENTION

1. Field of the Invention

The present invention relates to a digital communication system which is not influenced by multipath interference and applicable to, e.g., mobile radio communication.

2. Description of the Prior Art

Figure 1:
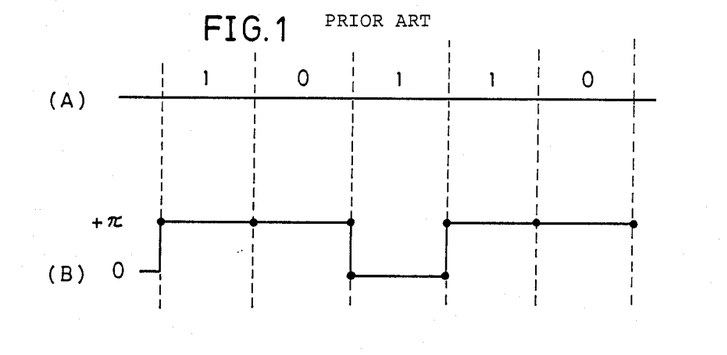
FIG. 1 shows a differentially encoded conventional BPSK modulation system.

In a conventional digital communication system such as a mobile radio communication system, a digital signal modulated by a binary information sequence is received through different propagation paths whereby the bit error rate is extremely deteriorated by mutual interference of the multiple waves. Such a disadvantage is now described with respect to a conventional binary phase shift keying (BPSK) signal. In FIG. 1, symbol (A) denotes a binary information sequence consisting of symbols 1 and 0 and symbol (B) denotes phase change of a BPSK signal obtained in correspondence to the binary information sequence. When differential detection is performed, the phase of the BPSK signal is shifted by $+\pi$ radians with respect to the binary information symbol 1 and no such change is caused with respect to 0.

Figure 2:
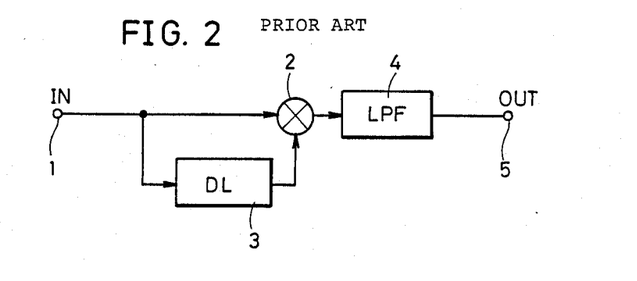
FIG. 2 is a schematic diagram showing a demodulation circuit for a BPSK signal.

FIG. 2 shows a differential detection circuit which demodulates the BPSK signal to detect the original binary information sequence. The BPSK signal applied to an IN terminal 1 is divided into two signals to be fed to one input terminal of a multiplier 2 as well as to the other input terminal thereof through a delay circuit 3 having a delay time of one time slot T. Then the two signals are multiplied by the multiplier 2 to be subjected to removal of frequency components twice the carrier frequency by a low pass filter (LPF) 4, and the original binary information signal, which is outputted from an OUT terminal 5, is reproduced.

For convenience of description a two ray model is assumed hereinafter as an example of multipath propagation.

In the case where the BPSK signal applied to the IN terminal 1 is the superposition of a BPSK wave (desired wave—hereinafter referred to as D wave) and its replica (undesired wave—hereinafter referred to as U wave) delayed by $\tau$ from the D wave, the output at the OUT terminal 5 is extremely reduced around portions in which the relative amplitude ratio $\rho$ of the U wave to the D wave is 1 and the carrier phase difference $\phi$ between the D and U waves is $\pi$ radians whereby the bit error rate is extremely inferior.

Figure 3:
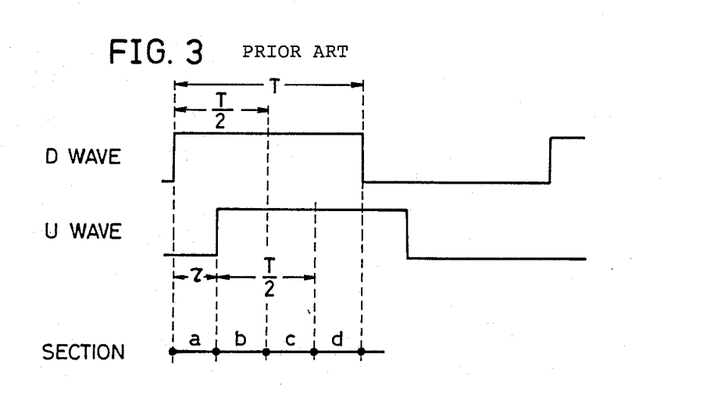
FIG. 3 shows the time relation between a D wave and a U wave in the BPSK modulation system.

FIG. 3 illustrates the time relation between the D and U waves. Symbol T denotes the length of a time slot for transmitting a binary information symbol. Symbol a denotes a section from the beginning of the D time slot to the beginning of the U time slot, symbol b denotes a section from the beginning of the U time slot to the midst of D time slot, symbol c denotes a section from the midst of D time slot to the midst of U time slot, and symbol d denotes a section from the midst of U time slot to the end of the D time slot.

With respect to demodulation outputs in the respective sections a to d, at the OUT terminal 5 in FIG. 2, the output in the section a depends on the symbol of a preceding bit (not shown), whereas the outputs in the sections b, c and d are not influenced by symbols of preceding bits but determined by the symbol of the present bit.

The respective outputs e(t) in the sections b, c and d are obtained by the following expressions (1):

When the symbol is 1:

$$e(t) = (1 + \rho^2 + 2\rho\cos\phi)$$

When the symbol is 0:

$$e(t) = -(1 + \rho^2 + 2\rho\cos\phi) \tag{1}$$

As obvious from the expressions (1), the respective outputs e(t) in the sections b, c and d are substantially reduced nearly to zero when the relative amplitude ratio $\rho$ of the U wave to the D wave tends to 1 and the carrier phase difference $\phi$ between the D and U waves tends to $\pi$ radians, whereby the so-called eye pattern may be dominated by the section a, and eye degradation and abrupt timing fluctuation occur. In general, the eye is deteriorated and burst errors occur, and consequently the bit error rate is deteriorated in portions around the condition of severe delay distortion ($\rho = 1$ and $\phi = \pi$ for two-wave model) in multipath propagation.

SUMMARY OF THE INVENTION

The prevent invention has been proposed to overcome the aforementioned problem of deterioration of the bit error rate, and an object thereof is to provide a digital communication system with improved bit error rate in multipath propagation in comparison with the conventional PSK or FSK modulation systems such as a BPSK system.

Another object of the present invention is to provide a communication system in which a demodulation output will not tend to zero and "eye" is opened even if the instantaneous amplitude ratio $\rho$ of a U wave relative to a D wave is around 1 and the instantaneous carrier phase difference $\phi$ between the D and U waves is around $\pi$, and there will occur now abrupt timing fluctuation of eye patterns in such condition.

The present invention is a communication system employing a signal with the phase of a carrier wave shifted by $\pm\Delta\theta$ in correspondence to each symbol of a binary information sequence whereby the phase shift operation is performed by $\Delta\theta/2$ (or $-\Delta\theta/2$) in the first half of one time slot and then further by $\Delta\theta/2$ (or $-\Delta\theta/2$) in the second half thereof, and the aformentioned modulated signal is to be modulated by a half bit differntial detector.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereafter described with reference to the accompanying drawings.

Description is now made on an embodiment in which the phase shift is performed by $\pm\pi/2$ per $\frac{1}{2}$ time slot.

Such a modulation system of shifting the phase of a carrier wave twice per time slot with respect to a binary information symbol is hereinafter referred to as a DSK (double phase shift keying) system.

Figure 4:
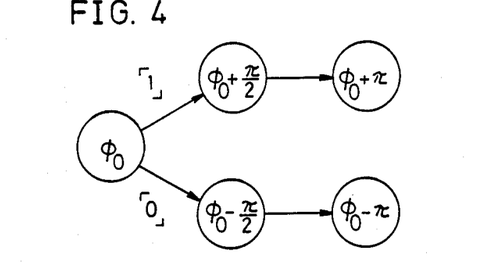
FIG. 4 illustrates an example of phase shift of a carrier wave in correspondence to binary information symbols in a DSK system according to the present invention.
Figure 5:
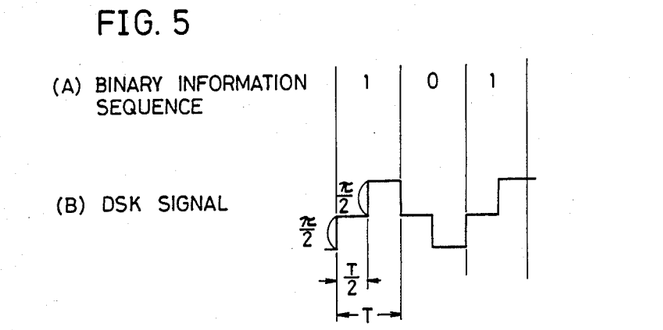
FIG. 5 illustrates relation between a binary information sequence and a DSK signal.

FIG. 4 illustrates an example of phase shift of carrier waves corresponding to binary information symbols 0 and 1 in the modulation system according to the present invention, and FIG. 5 shows phase change of carrier waves modulated by binary information sequence (101) in a modulator performing such phase shift operation.

In FIG. 4, arrows denote directions of phase shift corresponding to binary information symbols 1 and 0. In FIG. 5, symbol (A) denotes the example of binary information sequence and symbol (B) denotes the phase shift of a DSK signal. Symbol T denotes the length of one time slot, which corresponds to a symbol transmission interval of unit binary information symbols.

Description is now made on the manner of generating the DSK signal on the basis of FIGS. 4 and 5. The first binary information symbol 1 forming the binary information sequence let the carrier phase be shifted by $+\pi/2$ radians in the first $\frac{1}{2}$ time slot and then further by $+\pi/2$ radians in the following $\frac{1}{2}$ time slot, i.e., shifted by $+\pi$ radians in total. With respect to the second binary information symbol 0, the phase shift starts from $+\pi$ radians, i.e., the final phase in correspondence to the first symbol, and the second binary information symbol shifts the carrier phase by $-\pi/2$ radians and then further by $-\pi/2$ radians after $\frac{1}{2}$ time slot, i.e., shifted by $-\pi$ radians in total to return to the position of the initial phase of 0 radian.

The shift of a third binary information symbol 1 starts from 0 radian, i.e., the final phase in correspondence to the second symbol, and the third binary information symbol shifts the carrier phse by $+\pi/2$ radians and then further by $+\pi/2$ radians after $\frac{1}{2}$ time slot, i.e., shifts by $\pi$ radians in total to be in the phase of $+\pi$ radians with respect to the initial phase of 0 radian.

Thus, the DSK signal in the digital communication system according to the present invention is characterized in that a binary information symbol shifts the carrier phase twice by $+\pi/2$ or $-\pi/2$ radians per $\frac{1}{2}$ time slot, to finally shift by $+\pi$ or $-\pi$ radians.

Description is now made on regeneration of the binary information sequence in such case that a DSK signal is received through propagation paths of different delay times as well as the reason why the bit error rate in the DSK signal is improved under the presence of such interference in comparison with a conventional BPSK signal.

Figure 6:
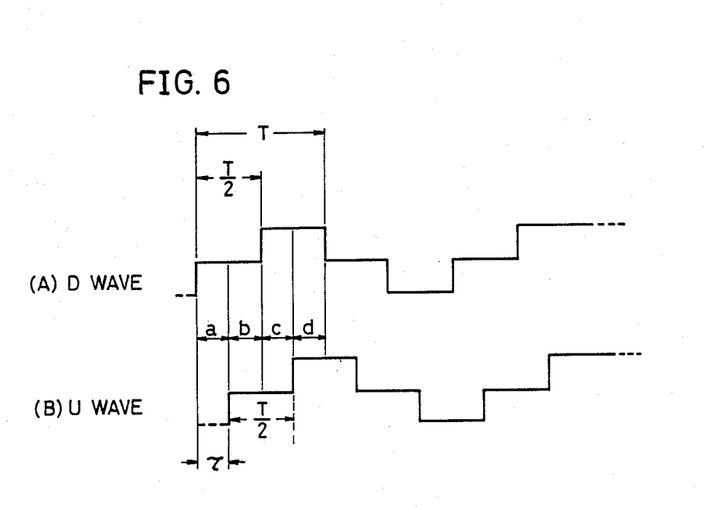
FIG. 6 illustrates relation between a U wave and a D wave in the DSK system.

FIG. 6 shows phase relation between D wave and U wave in correspondence to binary information sequence (101). Shown in FIG. 6 is a U wave received in a delay by $\tau$ from the D wave, for convenience of illustration.

Figure 7:
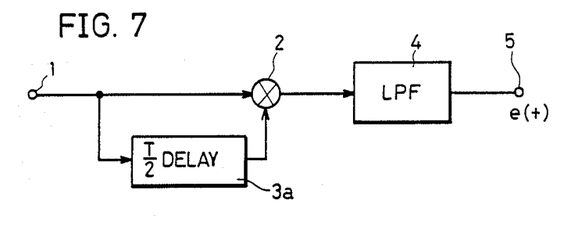
FIG. 7 shows the basic structure of a demodulation circuit for the DSK signal.

FIG. 7 shows basic structure of a demodulation circuit for the DSK signal, which is different in the delay time of a delay circuit 3a from that for the BPSK signal as shown in FIG. 2. The demodulation circuit as shown in FIG. 7 is formed by a differential detector, the delay time of which is set to $\frac{1}{2}$ time slot.

At a receiving point, the U wave is received with a delay of $\tau$ from the D wave, and both the D and U waves are fed to the demodulator. In sections b, c and d other than in each time slot T as shown in FIG. 6, this resultant wave includes correct information corresponding to respective binary information symbols, regardless of the state of interference between the D and U waves. The demodulation outputs e(t) in sections a, b, c and d are as follows:

Section a:      (2)

| $e(t) = (1 - \rho^2)$ | symbol change: "0" → "1" |
|---|---|
| $(1 + \rho^2 + 2\rho\sin\phi)$ | symbol change: "1" → "1" |
| $(-1 + \rho^2)$ | symbol change: "1" → "0" |
| $(-1 - \rho^2 + 2\rho\sin\phi)$ | symbol change: "0" → "0" |

Section b:

| $e(t) = (1 + \rho^2 + 2\rho\cos\phi)$ | symbol: "1" |
|---|---|
| $-(1 + \rho^2 + 2\rho\cos\phi)$ | symbol: "0" |

Section c:

| $e(t) = 1 + \rho^2 + 2\rho\sin\phi$ | symbol: "1" |
|---|---|
| $-(1 + \rho^2 - 2\rho\sin\phi)$ | symbol: "0" |

Section d:

| $e(t) = (1 + \rho^2 + 2\rho\cos\phi)$ | symbol: "1" |
|---|---|
| $-(1 + \rho^2 + 2\rho\cos\phi)$ | symbol: "0" | in which $\rho$ represents the instantaneous relative amplitude ratio of the U wave to the D wave and $\phi$ represents the instantaneous carrier phase difference between the D and U waves.

As obvious from the results of the above calculation, the demodulation output e(t) in the section a is indefinite since it is influenced by the preceding bit, while the polarity of the output signals in the sections b, c and d, are uniquely determined in correspondence to symbol of the present bit. Further, although the amplitude varies with the relative amplitude ratio $\rho$ of the U wave to the D wave and the phase relation therebetween, the last terms in the expressions for the outputs of sections b and d are in relation of $\cos\phi$ and $\sin\phi$ with that of section c to let these outputs compensate for each other such that one is increased while the other is decreased with respect to change in the phase difference $\phi$, whereby at least one of the sections b, d and c remains in large amplitude and there is no case that all of the outputs in the sections b, c and d are zero. Consequently, timing fluctuation of eye pattern is no more than the propagation delay time $\tau$, and the eye pattern will not close. Thus, the bit error rate is remarkably improved.

In the conventional BPSK system of shifting by 0 or $\pi$ radians, there is no portion corresponding to the section c which is in compensating relation with the sections b and d, and hence the bit error rate is extremely deteriorated in comparison with the DSK system according to the present invention.

Figure 8:
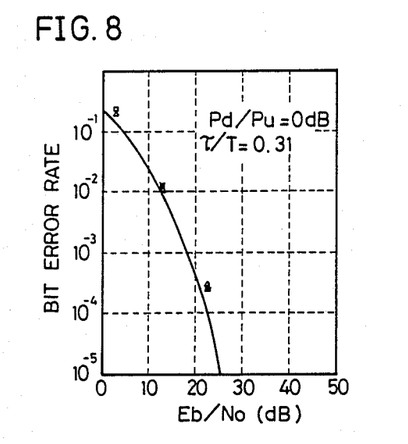
FIG. 8 shows an example of the bit error rate characteristic of the DSK system.
Figure 9:
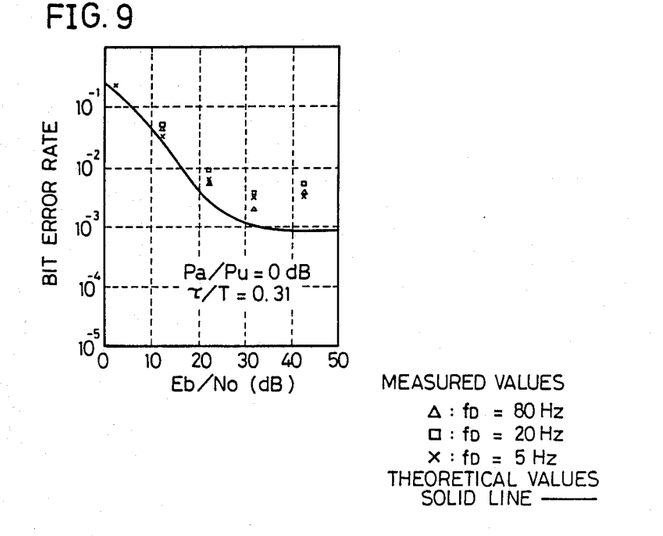
FIG. 9 shows an example of the bit error rate characteristic of the BPSK system.

FIG. 8 shows the bit error characteristic of the DSK signal according to the present invention, and FIG. 9 shows that of the conventional BPSK signal for reference. In FIGS. 8 and 9, the envelopes of D and U waves are assumed to be subject to Rayleigh distribution. Symbols $P_d$ and $P_u$ respectively denote average power levels of the D and U waves, symbol $E_b$ denotes signal energy per bit, symbol $N_o$ denotes noise power per unit frequency and symbol $f_D$ denotes the maximum fading frequency.

The bit error rate in the BPSK signal is around $10^{-3}$ at the lowest, while the bit error rate of the DSK signal goes beneath $10^{-5}$, whereby it is recognized that the bit error rate is remarkably improved in the DSK system according to the present invention.

Description is now made on definite examples of a modulation circuit and a demodulation circuit employed in the digital communication system according to the present invention.

Figure 10:
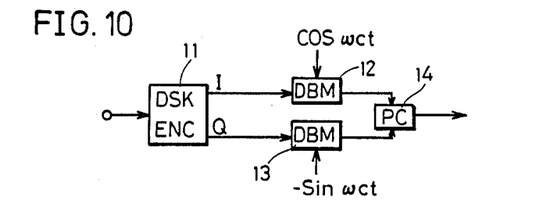
FIG. 10 shows an example of a modulation circuit in the DSK system.

FIG. 10 shows an example of the modulation circuit. In FIG. 10, numeral 11 denotes an encoding circuit (hereinafter referred to as DSK-ENC), which generates an in-phase component waveform (hereinafter referred to as I-CH signal) and a quadrature component waveform (hereinafter referred to as Q-CH signal) inherent in the DSK system with respect to the input binary information symbols. Numerals 12 and 13 denote multiplying modulators (hereinafter referred to as DBM) formed by double-balanced modulators, which are adopted to obtain the products of the I-CH signal and $\cos\omega_c t$ and the Q-CH signal and $-\sin\omega_c t$ ($\omega_c$: angular frequency of carrier wave) respectively. Numeral 14 denotes a power combiner (hereinafter referred to as PC) for combining the said two signals, to obtain the DSK signal as its output.

Figure 11:
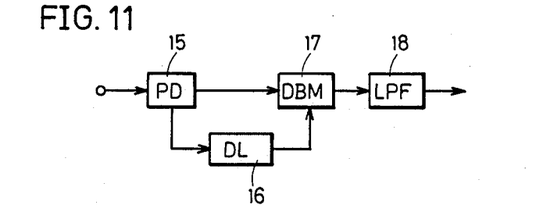
FIG. 11 shows an example of a demodulation circuit in the DSK system.

FIG. 11 shows an example of the demodulation circuit. Numeral 15 denotes a power divider (hereinafter referred to as PD) which is adopted to divide the received signal into two. Numeral 16 denotes a delay line (hereinafter referred to as DL), the delay time of which is set to $\frac{1}{2}$ time slot. Numeral 17 denotes a multiplying modulator to obtain the product of two signals. Numeral 18 denotes a low pass filter (hereinafter referred to as LPF) which integrates the output signal from the DBM 17 and remove its high-frequency component, thereby to obtain a differential detector output corresponding to a desired binary information sequence at the output thereof.

Figure 12:
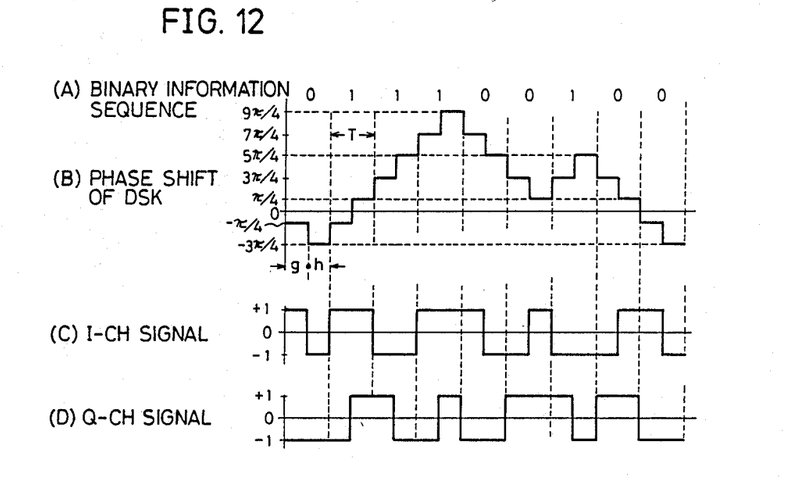
FIG. 12 illustrates the operation of a DSK-ENC 11.

Referring to FIG. 12, the DSK-ENC 11 is now described. In FIG. 12, symbol (A) denotes a binary information sequence, and symbol (B) denotes phase shift of the DSK signal corresponding to the binary information sequence, with the initial value being set to $+\pi/4$. When the initial value of the DSK signal is odd times the value $\pi/4$, the I-CH signal and the Q-CH signal to be applied to the DBMs 12 and 13 can be formed as binary level signals formed by $+1$ and $-1$ and the I-CH signal corresponding to the aforementioned binary information signal is as shown at FIG. 12(C) and the Q-CH signal is as shown at FIG. 12(D).

Figure 13:
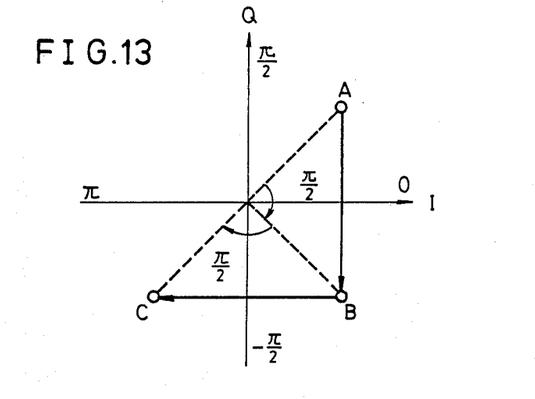
FIG. 13 illustrates relation between an I-CH signal and a Q-CH signal.

Referring now to FIG. 13, description is made on the fact that the I-CH signal and the Q-CH signal are as shown at FIGS. 12(C) and (D) in the case of the DSK signal as shown at FIG. 12(B).

In FIG. 13, the abscissa I denotes an in-phase component and the ordinate Q denotes a component orthogonal to the in-phase component I.

The starting point $\pi/4$ as shown at FIG. 12(B) is indicated as a point A in FIG. 13. Since the first binary information symbol is 0, the phase shift is performed by $-\pi/2$ to reach $-\pi/4$ in the first half (section g at FIG. 12(B)) of the time slot corresponding to the symbol 0. This corresponds to shift from point A to point B in FIG. 13, and the components I and Q are both $+1$ at point A, while the in-phase component I is $+1$ and the quadrature component Q is $-1$ at point B showing the phase in the section g.

In a section h at FIG. 12(B), the phase is further shifted by $-\pi/2$ to reach $(-\frac{3}{4})\pi$. This corresponds to shift from point B to point C in FIG. 13, and the components I and Q are both $-1$ at point C.

Thus, the I-CH signal and the Q-CH signal at FIGS. 12(C) and (D) are produced in the aforementioned manner.

Therefore, the DSK signal corresponding to the binary information sequence (FIG. 12(A)) can be obtained by generating the waveforms as shown at FIGS. 12(C) and (D) to apply the same as the I-CH and Q-CH signals to the DBMs 12 and 13 respectively.

Figure 14:
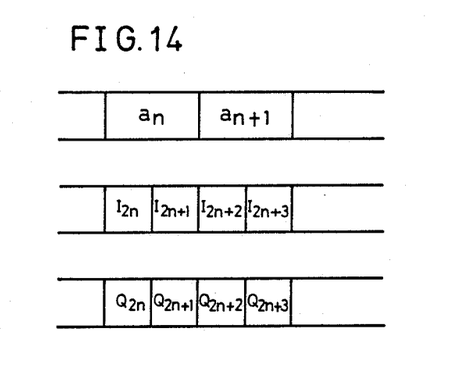
FIG. 14 illustrates correspondence between the binary information symbol and the output signal from the DSK-ENC 11.

Assuming that an n-th information symbol of the binary information sequence is indicated by $a_n$, the in-phase components of the corresponding output signal of the DSK-ENC 11 are indicated by $I_{2n}$ and $I_{2n+1}$ and the quadrature components are indicated by $Q_{2n}$ and $Q_{2n+1}$ as shown in FIG. 14, encoding rules of $a_n$, $I_k$ and $Q_k$ are expressed as follows:

$$I_{2n} = Q_{2n-1} \cdot \oplus a_n$$

$$I_{2n+1} = Q_{2n} \cdot \oplus a_n$$

$$Q_{2n} = I_{2n-1} \cdot \oplus \overline{a_n}$$

$$Q_{2n+1} = I_{2n} \cdot \oplus \overline{a_n} \tag{3}$$

In case of $a_n = 1$, phase shift is performed twice as $+\pi/2$ and $+\pi/2$, while the shift is performed twice as $-\pi/2$ and $-\pi/2$ in case of $a_n = 0$. Symbols with subscripts k of even numbers indicate the in-phase and quadrature components in the first $\frac{1}{2}$ time slot, while those with subscripts k of odd numbers indicate the in-phase and quadrature components in the second $\frac{1}{2}$ time slot. The sequence of the binary symbols 1 and 0 thus obtained is level-converted into signals of voltage levels $+V$ and $-V$ required for the DBMs 12 and 13 thereby to obtain practical signals for driving the DBMs 12 and 13.

Figure 15:
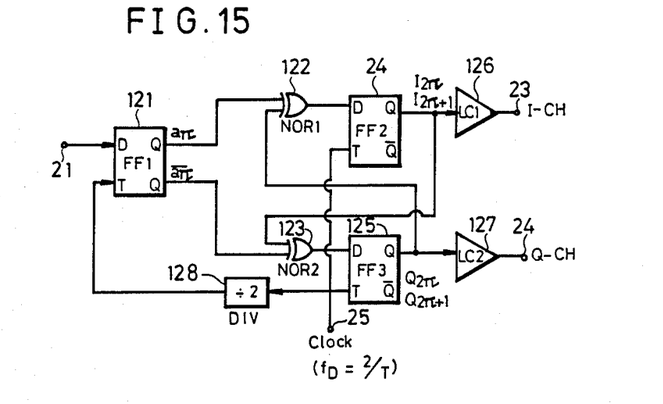
FIG. 15 shows an example of the DSK-ENC 11.

The DSK-ENC 11 performing such encoding operation is formed, e.g., as shown in FIG. 15.

In FIG. 15, numeral 21 denotes an input terminal for the binary information sequence, numeral 121 denotes a first D-type flip-flop (hereinafter referred to as $FF_1$), numeral 122 denotes a first exclusive OR gate (hereinafter referred to as $EXOR_1$), numeral 123 denotes a second exclusive OR gate (hereinafter referred to as $EXOR_2$), numeral 124 denotes a second D-type flip-flop (hereinafter referred to as $FF_2$), numeral 125 denotes a third D-type flip-flop (hereinafter referred to as $FF_3$), numeral 126 denotes a first level converter (hereinafter referred to as $LC_1$), numeral 127 denotes a second level converter (hereinafter referred to as $LC_2$), numeral 128 denotes a ½-divider (hereinafter referred to as DIV), numeral 23 denotes an in-phase component output terminal (hereinafter referred to as I-CH output terminal), numeral 24 denotes a quadrature component output terminal (hereinafter referred to as Q-CH output terminal) and numeral 25 denotes a clock signal input terminal, which requires a clock signal having twice the frequency as the symbol rate period as the ½ time slot.

The $FF_1$ 121 outputs $a_n$ and $a_n$ corresponding to the binary information symbols. These signals are processed according to the aforementioned encoding rules of $a_n$, $I_k$ and $Q_k$ by a cross circuit formed by the $EXOR_1$ 122, $EXOR_2$ 123, $FF_2$ 124 and $FF_3$ 125. Then the outputs are level-converted by the $LC_1$ 126 and $LC_2$ 127 to generate the I-CH signal and the Q-CH signal which are changed to the voltage levels $+V$ and $-V$ required for phase inversion control in the DBMs 12 and 13.

component Q is given by $\theta = \tan^{-1} Q/I$. Hence an arbitrary phase of carrier for each ½ time slot corresponding to the binary information sequence can be obtained by changing the amplitude of I-CH signal and Q-CH signal appropriately. $\Delta\theta/2$ DSK corresponding to any angle $\Delta\theta$ (not limited to $\pi$) to be mentioned later can be obtained by this method, i.e., by using ROMs to store I and Q-CH signal waveforms, for instance.

The amount of the phase shift has been specified at $\pi/2$ in the foregoing description, while the following description is made on such case that the amount of the phase shift is not restricted to $\pi/2$.

Figure 17:
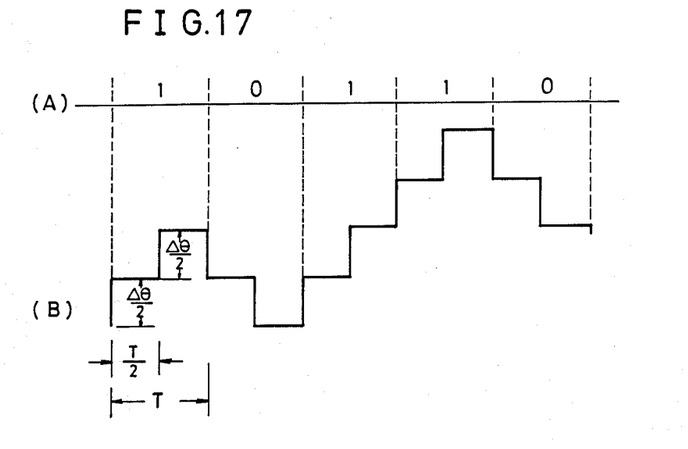
FIG. 17 illustrates a $\Delta\theta/2$ DSK signal in which the amount of phase shift per $\frac{1}{2}$ time slot is $\Delta\theta/2$.

FIG. 17 shows the manner of shifting the phase by $\pm\Delta\theta/2$ per ½ time slot thereby to shift the same by $\pm\Delta\theta$ in total in correspondence to a binary information symbol. Such a system of shifting the phase by $\pm\Delta\theta/2$ in the first half time slot and shifting the same further by $\pm\Delta\theta/2$ in the second half of the time slot is called as $\Delta\theta/2$ DSK modulation system.

In FIG. 17, symbol (A) denotes a binary information sequence and symbol (B) denotes a $\Delta\theta/2$ DSK-modulated signal. When the binary information symbol is 1, the phase is first shifted by $+\Delta\theta/2$ and then further by $+\Delta\theta/2$ after a lapse of ½ time slot, whereby the total amount of the phase shift is $\Delta\theta$. When the binary information symbol is 0, the phase is shifted by $-\Delta\theta/2$ and then further by $-\Delta\theta/2$ after a lapse of ½ time slot.

When the multiple waves of the $\Delta\theta/2$ DSK signal are received and demodulated by the differential demodulator as shown in FIG. 7, an OUT terminal 5 outputs demodulated signals $e(t)$ in the following expressions (4). It is to be noted that sections a to d correspond to the sections a to d as shown in FIG. 6.

$$e(t) = \begin{cases} (\sin\Delta\theta/2)(1-\rho^2) & \text{symbol change: "0"} \rightarrow \text{"1"} \\ (\sin\Delta\theta/2)\{1+\rho^2+2\rho\cos(\Delta\theta/2-\phi)\} & \text{symbol change: "1"} \rightarrow \text{"1"} \\ -(\sin\Delta\theta/2)(1-\rho^2) & \text{symbol change: "1"} \rightarrow \text{"0"} \\ -(\sin\Delta\theta/2)\{1+\rho^2+2\rho\cos(\Delta\theta/2+\phi)\} & \text{symbol change: "0"} \rightarrow \text{"0"} \end{cases} \quad (4)$$

Section b, d:

$$e(t) = \begin{cases} (\sin\Delta\theta/2)(1+\rho^2+2\rho\cos\phi) & \text{symbol: "1"} \\ -(\sin\Delta\theta/2)(1+\rho^2+2\rho\cos\phi) & \text{symbol: "0"} \end{cases}$$

Section c:

$$e(t) = \begin{cases} (\sin\Delta\theta/2)\,1+\rho^2+2\rho\cos(\phi-\Delta\theta/2) & \text{symbol: "1"} \\ -(\sin\Delta\theta/2)\,1+\rho^2+2\rho\cos(\phi+\Delta\theta/2) & \text{symbol: "0"} \end{cases}$$

Demodulation is performed by the circuit as shown in FIG. 11.

Figure 16:
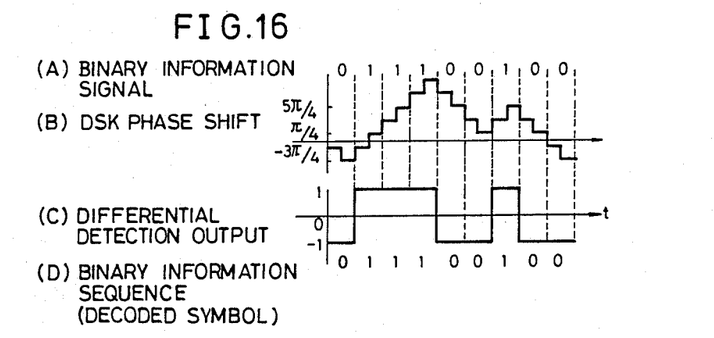
FIG. 16 illustrates the operation of the demodulation circuit for the DSK signal.

FIG. 16 illustrates the operation of the demodulation circuit. In FIG. 16, symbol (A) denotes binary information sequence and symbol (B) denotes the phase shift of the DSK signal, while symbol (C) denotes the differential detector output obtained by the demodulation circuit as shown in FIG. 11 and symbol (D) denotes the detected binary information sequence. The differential detector output as shown in FIG. 16(C) is obtained by taking the product of the DSK signal as shown at FIG. 16(B) and the same DSK signal delayed by ½ time slot and then passing the product through the LPF 18, thereby to obtain an original binary information sequence.

Figure 18:
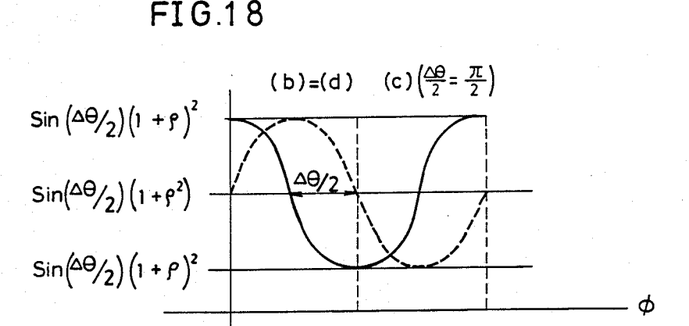
FIG. 18 illustrates the demodulation output of the $\Delta\theta/2$-DSK signal.

In the foregoing, the description was made in such a way that the in-phase carrier and the quadrature carrier are phase-modulated in accordance with the DSK encoding rule and the modulated outputs are combined so that a predetermined $\pi/2$DSK signal is created. Bearing in mind, however, that the phase $\theta$ of the DSK signal created by the in-phase component I and the quadrature FIG. 18 shows calculated values of the above expressions for b, d and c vs. $\phi$.

The values are changed sinusoidally with a central value $\sin(\Delta\theta/2)(1+\rho_2)$ lying between the maximum value $\sin(\Delta\theta/2)(1+\rho)^2$ and the minimum value $\sin(\Delta\theta/2)(1-\rho)_2$. The value in the section c deviates by $(\Delta\theta/2)$ along the $\phi$ axis from those in the sections b and d. In FIG. 18, $\Delta\theta/2$ is equal to $\pi/2$.

Thus, the output values $e(t)^{b,d}$ in the sections b and d and $e(t)^c$ in the section c as a function of $\phi$ are out of phase by $(\Delta\theta/2)$ from each other, whereby the output from the differential demodulator will not tend to zero at the same value of $\phi$.

Consequently, the eye pattern is not annihilated and therefore little timing fluctuation is observed.

Figure 19:
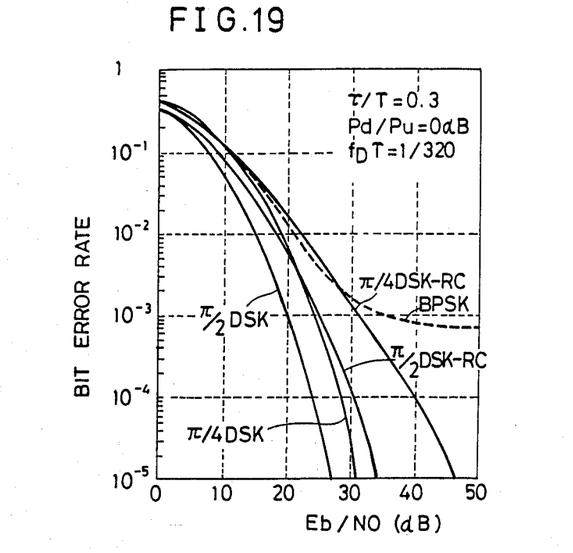
FIGS. 19 and 20 show examples of the characteristics of the $\Delta\theta/2$ DSK system and some other modified systems.
Figure 20:
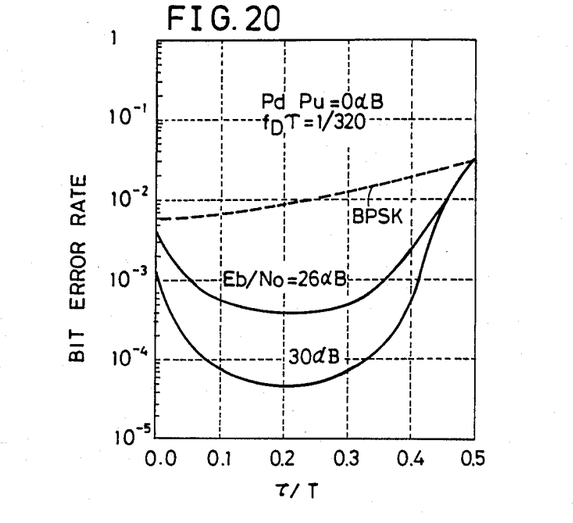

FIGS. 19 and 20 show examples of the performance of the $\Delta\theta/2$ DSK modulation system. FIG. 19 shows change in the bit error rate vs signal-to-noise ratios and FIG. 20 shows change in the bit error rate with respect to change in the delay time of the D and U waves under a constant signal-to-noise ratio. As for the shown case, the envelopes of D and U waves are both subject to Rayleigh distribution. Symbols $P_d$ and $P_u$ respectively denote average power of the D and U waves, symbol $E_b$ denotes signal energy per bit, symbol $N_o$ denotes noise power per unit frequency and symbol $f_D$ denotes the maximum fading frequency.

The broken line in FIG. 19 denotes the characteristic of a BPSK system.

As understood from FIG. 18, the degree of compensation between $e(t)^{b,d}$ and $e(t)^c$ is increased by selecting $\Delta\theta$ at a large value toward $\pi$, although broader frequency bandwidth is required. Since $e(t)^{b,d}$ and $e(t)^c$ are proportional to $\sin(\Delta\theta/2)$ the improvement of detector output is most increased when $\Delta\theta/2$ is between $\pi/2$ and $\pi$. It has been confirmed that $(\Delta\theta/2)\approx110°$ is an optimum value.

$\Delta\theta/2$ phase shift is performed in a stepped manner per ½ time slot in the foregoing description. The bit error rates in such case that the phase shift is performed in the form of smoothed raised cosine waves form for controlling the frequency bandwidth of the signal are shown as $\pi/4$ DSK-RC and $\pi/2$ DSK-RC in FIG. 19.

The bandwidth of the modulated signal is further narrowed by selecting smaller $\Delta\theta/2$ and narrowed also in the case of the raised cosine waves, while the degree of improvement in the bit error rate is decreased.

However, in both of $\Delta\theta/2$ DSK and $\Delta\theta/2$ DSK-RC, the bit error rates are certainly improved especially in the region with large signal-to-noise ratios, in comparison with the general BPSK system.

Figure 21:
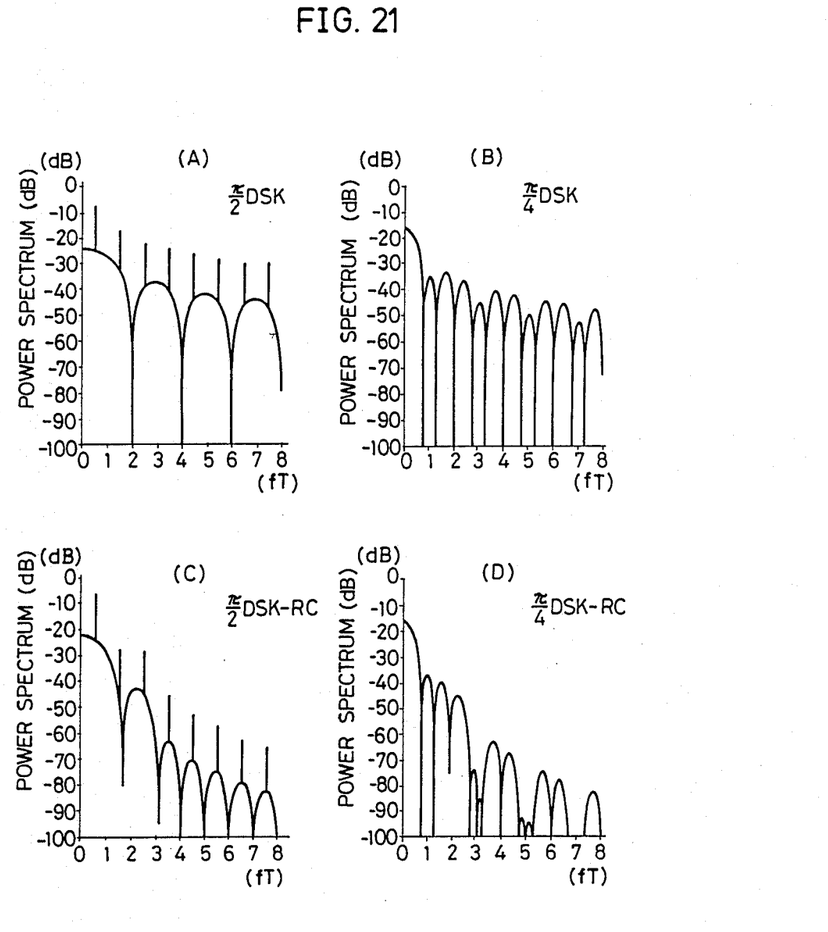
FIG. 21 shows power spectra of the $\Delta\theta/2$-DSK system according to the present invention and some other modified systems.

FIG. 21 shows comparison of power spectra of the aforementioned various systems.

Figure 22:
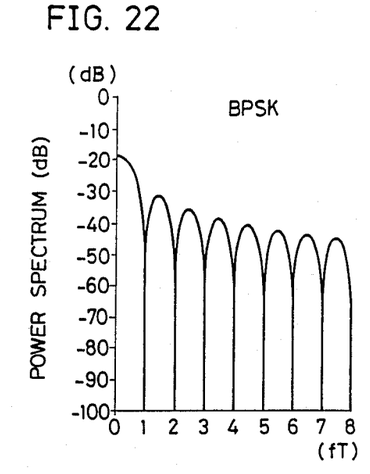
FIG. 22 shows the power spectrum of the conventional BPSK system.

In FIG. 21, symbol (A) denotes $\pi/2$ DSK, symbol (B) denotes $\pi/4$ DSK, symbol (C) denotes $\pi/2$ DSK-RC and symbol (D) denotes $\pi/4$ DSK-RC. FIG. 22 shows the power spectrum of the BPSK system for comparison.

Figure 23:
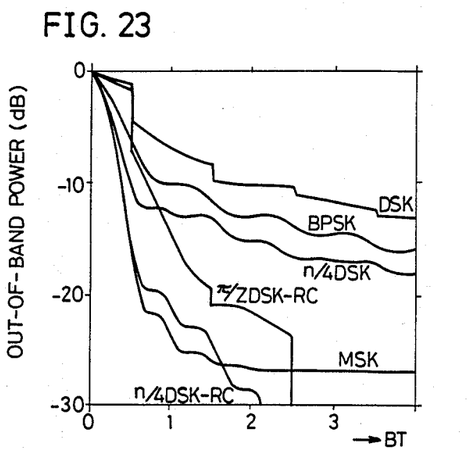
FIG. 23 shows out-of-band power characteristics.

FIG. 23 shows comparison of out-of-band power characteristics of the respective systems.

In FIGS. 21 through 23, symbol f denotes the frequency, symbol T denotes the time slot and symbol B denotes the bandwidth.

According to the present invention as hereinabove described, the phase of the carrier wave is shifted twice by $\pm\Delta\theta/2$ per ½ time slot in correspondence to the binary information symbols, and hence the demodulation output is not seriously decreased, regardless of the instantaneous phase difference between the D and U waves in the multipath propagation, whereby provided is a digital communication system with improved bit error rate.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital communication system for transmitting binary information symbols, including a first information symbol and a second information symbol, through a transmission medium formed by a multipath channel wherein each path has a substantially different transmission time, the digital communication system being capable of improving symbols comprising:

transmitting means for generating and transmitting through said transmission medium a phase shift keyed transmission signal which, in correspondence with the binary information symbols sent out at a predetermined time slot, shifts a phase of an information signal by $\Delta\theta/2$ for each ½ time slot two times in succession for said first information symbol, and shifts the phase by $-\Delta\theta/2$ for each ½ time slot two times in succession for the other information symbol;

receiving means for receiving the transmitted signal transmitted through said transmission medium; and demodulating means for dividing a signal received by said receiving means into two signals delaying, by ½ time slot, one of the two signals to obtain a delayed signal, multiplying the delayed signal by the other one of said two signals to obtain a product signal and integrating said product signal to obtain the original binary information symbol.

2. A digital communication system in accordance with claim 1, wherein
said multipath channel is a multipath fading channel.

3. A digital communication system in accordance with claim 1, wherein
the phase shift for each said ½ time slot is $\pi/2$.

4. A digital communication system in accordance with claim 1, wherein
the phase shift for each said ½ time slot is $\pi/4$.

5. A digital communication system in accordance with claim 1, wherein
the phase shift for each said ½ time slot is 110 degrees.

6. A digital communication system in accordance with any one of claims 3 through 5, wherein
the phase shift for each said ½ slot occurs in a stepped manner.

7. A digital communication system in accordance with any one of claims 1, 2, or 3, wherein
said phase shift for each said ½ time slot is defined by a raised cosine function.

8. In a digital communication system for transmitting binary information symbols, including a first information symbol and a second information symbol, through a transmission medium formed by a multipath channel wherein each path has a substantially different transmission time, a method of improving bit error rate, comprising the steps of:

transmitting through said medium a phase shift keyed transmission signal which, in correspondence with the binary information symbols sent out at a predetermined time slot, shifts a phase of an information signal by $\Delta\theta/2$ for each one-half time slot two times in succession for said first information symbol, and shifts the phase by $-\Delta\theta/2$ for each one-half time slot two times in succession for the other information symbol;

receiving the transmitted signal;

dividing a received signal into two signals; and delaying by one-half time slot, one of said two signals to obtain a delayed signal, multiplying the delayed signal by the other one of said two signals to obtain a product signal and integrating said product signal to obtain the original binary information symbol having an improved bit error rate.

* * * * *